United States Patent [19]

Hickel et al.

[11] Patent Number: 5,237,392
[45] Date of Patent: Aug. 17, 1993

[54] DETERMINATION OF REFRACTIVE INDEX AND THICKNESS OF THIN LAYERS

[75] Inventors: Werner Hickel, Mannheim; Wolfgang Knoll, Mainz, both of Fed. Rep. of Germany

[73] Assignee: BASF Aktiengesellschaft, Ludwigshafen, Fed. Rep. of Germany

[21] Appl. No.: 928,083

[22] Filed: Aug. 13, 1992

Related U.S. Application Data

[63] Continuation-in-part of Ser. No. 754,298, Sep. 4, 1992, abandoned, which is a continuation of Ser. No. 494,548, Mar. 16, 1990, abandoned.

[30] Foreign Application Priority Data

Mar. 21, 1990 [DE] Fed. Rep. of Germany ....... 3909144

[51] Int. Cl.$^5$ ...................... G01B 11/02; G01N 21/41
[52] U.S. Cl. .................................... 356/381; 356/445
[58] Field of Search ................................ 356/381, 445

[56] References Cited

U.S. PATENT DOCUMENTS

| | | | |
|---|---|---|---|
| 4,828,387 | 5/1989 | Sawyers et al. | 356/319 |
| 4,844,613 | 7/1989 | Batcheldler et al. | 356/445 |
| 5,049,462 | 9/1991 | Funhoff et al. | 365/215 |

OTHER PUBLICATIONS

Rotherhäusler et al "Surface-Plasmon Microscopy" Nature, vol. 332 (14 Apr. 1988) pp. 615-617.
Rothenhäusler et al "Interferometric determination of the complex wave vector of plasmon surface polaritons" J. Opt. Soc. Am. B, vol. 5, No. 7 (Jul. 1988) pp. 1401-1405.
Surface Polaritons-propagating . . ., Burstein et al., J. Vac. Sci. Technol., vol. 11, No. 6, Nov./Dec. 1974.
Physics of Thin Films, Francombe, Academic Press, vol. 9, 1977 pp. 145-261.
Photoacoustic Observation of Nonradiative . . . Inagaki et al. Physical Review B, vol. 24, No. 6, Sep. 15, 1981.
On the Decay of Plasmon Surface Polaritions . . ., Rothenhausler et al. Surface Science 137 (1984) 373-383.
Electromagnetic Surface Excitations . . . Wallis, Spring-Verlag Proceedings of an International Summer School at Ehore Majorana Center, Erice, Italy Jul. 1-13, 1985, pp. 2-29.
Total Internal Diffraction of Plasmon Surface Polaritions Rothenhausler et al., Appl. Phys. Lett. 51 (11), Sep. 14, 1987.
Optik Dunner Schichten, Wolter, Springer-Verlag 1956 pp. 461-554.

Primary Examiner—Richard A. Rosenberger
Attorney, Agent, or Firm—Keil & Weinkauf

[57] ABSTRACT

The refractive index and thickness of ultrathin layers $s < 1$ $\mu$m in thickness are determined by recording the layers, which have been applied to a solid support, by surface plasmon microscopy as a function of the angle of incidence of the incident laser beam, the method making it possible to determine layer thicknesses with a vertical resolution $\geq 0.1$ nm and a simultaneous lateral resolution $\geq 5$ $\mu$m.

7 Claims, 2 Drawing Sheets

DETERMINATION OF REFRACTIVE INDEX AND THICKNESS OF THIN LAYERS

This application is a Continuation-in-Part application of Ser. No. 07/754,298, filed Sep. 4, 1992, now abandoned, which is a continuation application of Ser. No. 07/494,548, filed Mar. 16, 1990, now abandoned.

The present invention relates to a method for determining the refractive index and thickness of ultrathin layers.

Using the existing method of surface plasmon spectroscopy, the refractive index or thickness of an ultrathin layer could only be determined to a lateral resolution of $\geq 0.5 \times 0.5$ mm$^2$.

BACKGROUND OF THE INVENTION

Plasmon surface polaritons (PSPs) are bound non-radiative electromagnetic waves that arise due to polarization charges which travel along a metal/dielectric interface (cf. E. Burstein, W. P. Chen, Y. J. Chen and A. Hartstein, J. Vac. Sci. Technol. 11 (1974), 1004). Their field intensity is at a maximum at the metal surface and decays exponentially perpendicular to the interface not only into the metal but also into the dielectric (cf. H. Raether, in: Physics of Thin Films (eds. G. Hass, M. H. Francombe and R. W. Hoffmann), vol. 9, 145–261, J. Wiley, New York 1977).

As a consequence of dissipative and radiative losses these waves are also damped in their propagation direction (cf. T. Inagaki, K. Kagani and E. T. Arakawa, Phys. Rev. 824 (1981), 3644, and B. Rothenhäusler, J. Rabe, P. Korpiun and W. Knoll, Surf. Sci. 137 (1984), 373). The interest in PSPs has increased in recent years since they have been successfully used for field enhancement in various surface spectroscopic studies on adsorbates and thin films (cf. Electromagnetic Surface Excitation, R. F. Wallis and G. I. Stegeman, eds., Springer, Berlin 1986).

PSPs can be considered a surface-specific light (cf. W. Knoll, B. Rothenhäusler and W. Hickel, SPIE Proceedings, Los Angeles, 1989) whose optical phenomena are similar to those for plane electromagnetic waves. Examples are diffraction of PSPs by a dielectric phase grating (cf. B. Rothenhäusler and W. Knoll, Appl. Phys. Letters 51 (1987), 783), interferometry between PSPs and a driver photon field (cf. B. Rothenhäusler and W. Knoll, J. Opt. Soc. Am. 85 (1988), 1401), and surface plasmon microscopy (cf. B. Rothenhäusler and W. Knoll, Nature 332 (1988), 615).

DESCRIPTION OF THE INVENTION

It is an object of the present invention to devise a method for determining the refractive index and/or the thickness of ultrathin layers with significantly better lateral resolution.

We have found, surprisingly, that this object is achieved with the aid of angle-dependent surface plasmon microscopy, which improves the lateral resolution to $\geq 5 \times 5$ $\mu$m$^2$.

The present invention accordingly provides a method for determining the refractive index or thickness of a layer < 1 $\mu$m in thickness, which comprises recording the layer, which has been applied to a solid support, by means of surface plasmon microscopy as a function of the angle of incidence of the incident laser beam.

It is possible according to the present invention to determine the thickness of a layer with a vertical resolution $\geq 0.1$ nm and simultaneous lateral resolution $\geq 5$ $\mu$m.

For this purpose, the layers to be examined have preferably been applied to a metallic or semiconductor layer.

The SPM method according to the present invention is particularly suitable for imaging low-contrast samples, for example lipid monolayers or specially structured SiO$_2$ layers produced by CVD.

There now follow detailed observations concerning the method according to the present invention.

Surface plasmon polaritons are excited with a coupling arrangement (cf. H. Raether, in: Physics of Thin Films (eds. G. Hass, M. H. Francombe and R. W. Hoffmann), vol. 9, 145–261, J. Wiley, New York 1977), such as a grating, Otto or Kretschmann arrangement, preferably a Kretschmann arrangement, using monochromatic parallel light. The preferred light source is a helium/neon laser. In the Kretschmann arrangement, the base of a prism (made for example of BK7 glass) is coated either directly with a metal or semiconductor layer or indirectly by bonding an appropriately coated microscope slide with the uncoated face to the prism using an immersion fluid. In order to achieve a contrast in PSP microscopy which is angle dependent and gives results to which the Fresnel equations are applicable, it is necessary to have a support which strongly damps the excited plasmon surface polaritions (PSPs) such that their propagation length is shorter than the thickness of the layer to be determined. The short propagation length of the PSPs results in the attainment of two resonance minimums upon PSP microscopy. The proper selection of a metal layer system on the support is critical to the invention because of the influence of the metal layer system on the properties of the PSPs, particularly their propagation length. A support which is glass coated with a thin chromium layer overcoated with gold provides a surface which damps the PSPs to a propagation length of about 0.5 $\mu$m which allows layer thickness determinations of less than 1 $\mu$m. Preferably, the chromium layer of the support has a thickness of 2.5–10.0 nm and the gold layer has a thickness of 10–45 nm. The thickness of the metal layers must be chosen such that the electric field of the PSPs can extend from the outer layer surface to all of the metal layers. The PSPs have an electric field which extends about 60–70 nm into the surface. Thus, the total thickness of the metal layers should not exceed 70 nm or to a layer assembly made of chromium and gold.

The method according to the present invention is also suitable for constructing a sensor where the layer to be examined is chemically, physico-chemically or biologically active, and permits the detection of time-dependent chemical, biological and/or physical processes.

Chemically, physico-chemically and biologically active layers for the purposes of the present invention are layers with which it is possible for example to carry out chemical or specific adsorption reactions or to affect the physical properties in a specific manner by physico-chemical means.

The layers to be examined are applied to the metal or semiconductor layer. Examples of layers which might be examined are those which can be applied by the Langmuir-Blodgett technique, by adsorption from the liquid phase (self assembly technique), by spin coating or by deposition or adsorption from the gas phase.

The Langmuir-Blodgett technique is known per se. The substance forming the layer to be examined is dissolved in an organic water-insoluble solvent, for example chloroform, the solution is spread out on the water surface of the Langmuir film balance, and the solvent evaporates, leaving a layer exactly one molecule thick on the water surface. This surface layer at the air/water interface is then compressed by advancing the movable barrier of the film balance to a point where a defined layer only one molecule thick is obtained. This unimolecular layer is then transferred at constant surface pressure to a substrate by dipping.

The sample prepared by one of the abovementioned methods is examined by surface plasmon microscopy (SPM; cf. the abovementioned paper in Nature 332 (1988), 615). In surface plasmon microscopy, the plasmon surface polaritons which are scattered by the sample couple via the prism to light, which is collected with a lens, producing an image of the interface. This image can be recorded with a video camera and stored on a magnetic tape for later analysis.

DETAILED DESCRIPTION OF THE DRAWINGS

Figure 1:
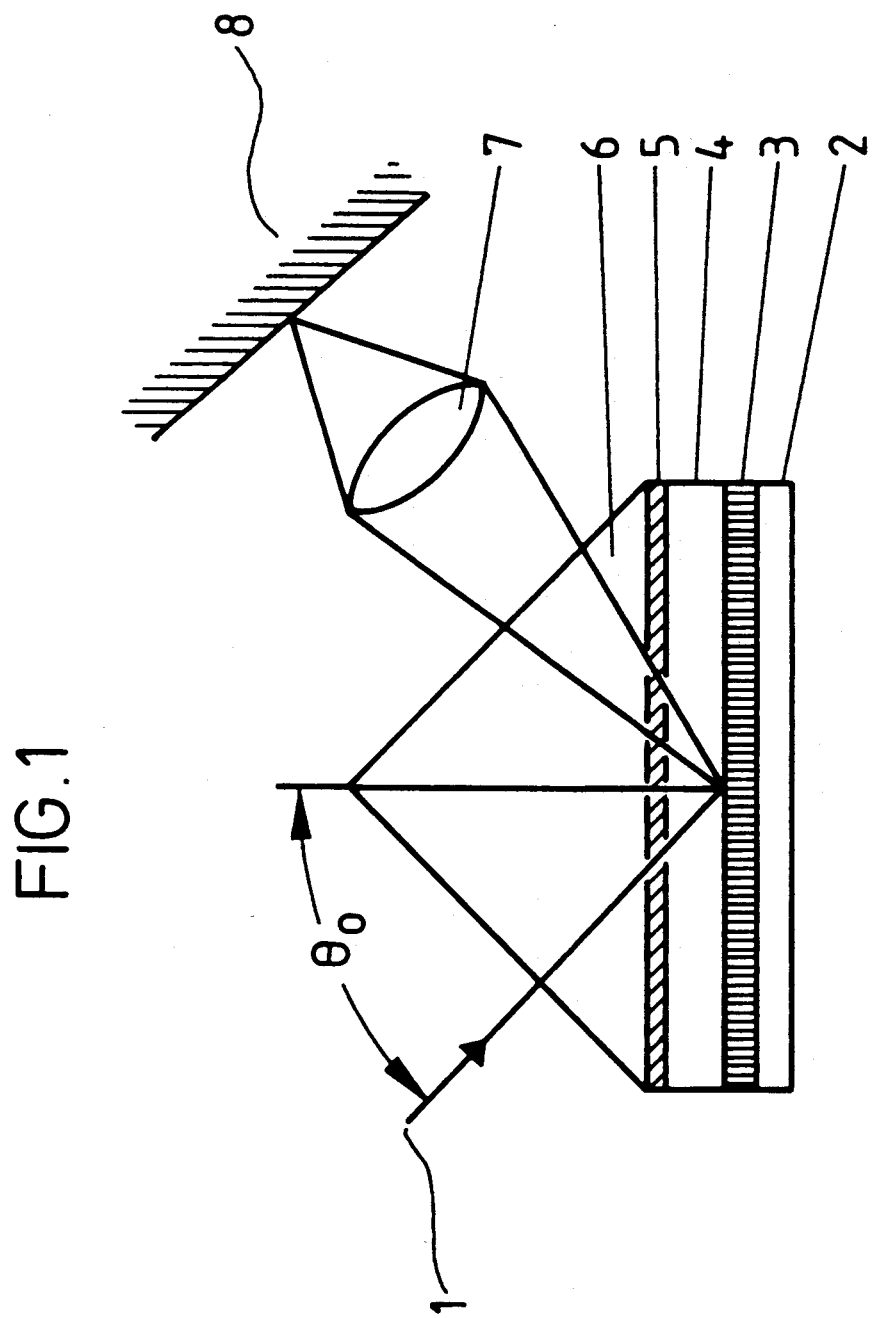
FIG. 1 depicts the set-up of the surface plasmon microscope used in the invention.

The surface plasmon microscope used according to the present invention is schematically depicted in FIG. 1, where 1 signifies a light source, 2 a sample (a lipid layer), 3 a metal layer, 4 a microscope slide, 5 the immersion fluid, 6 a glass prism, 7 a lens and 8 a video camera (or screen).

To characterize the thin layers in respect of refractive index and thickness with a lateral resolution of $5 \times 5$ $\mu m^2$, the SPM technique is performed with angle dependence within the domain of PSP resonance. The SPM images are recorded on magnetic tape and/or analyzed with an image analyzer as a function of the angle of incidence of the light (cf. FIG. 1). The image is analyzed by determining the average grayness value of an area in the image corresponding to an area of $5 \times 5$ $\mu m^2$. This grayness value corresponds to the reflected light intensity in this area. Standardization relative to the maximum light intensity gives the relative intensity of reflected light. The relative intensities thus obtained are plotted against the angle (cf. FIG. 2). Simulated curves are fitted to the measured curves with the aid of Fresnel theory (cf. H. Wolter in Handbuch der Physik (ed. S. Flügge, Springer 56)). The fitted curve directly reveals the thickness or refractive index of the analyzed area $5 \times 5$ $\mu m^2$ in size.

EXAMPLE 1

Dimyristoylphosphatidic acid (DMPA) (dissolved in chloroform) is spread onto pure water and, after the solvent has evaporated, applied by the Langmuir-Blodgett technique at a pressure of 5-6 mN.m$^{-1}$ (in the coexistence phase) to a microscope glass slide coated with 2.5 nm of chromium and 40 nm of gold. It is known that lipid monolayers in the coexistence phase are quasi-two-dimensional systems composed of crystalline and amorphous areas. It is likely that these areas differ in respect of thickness and refractive index.

Figure 2:
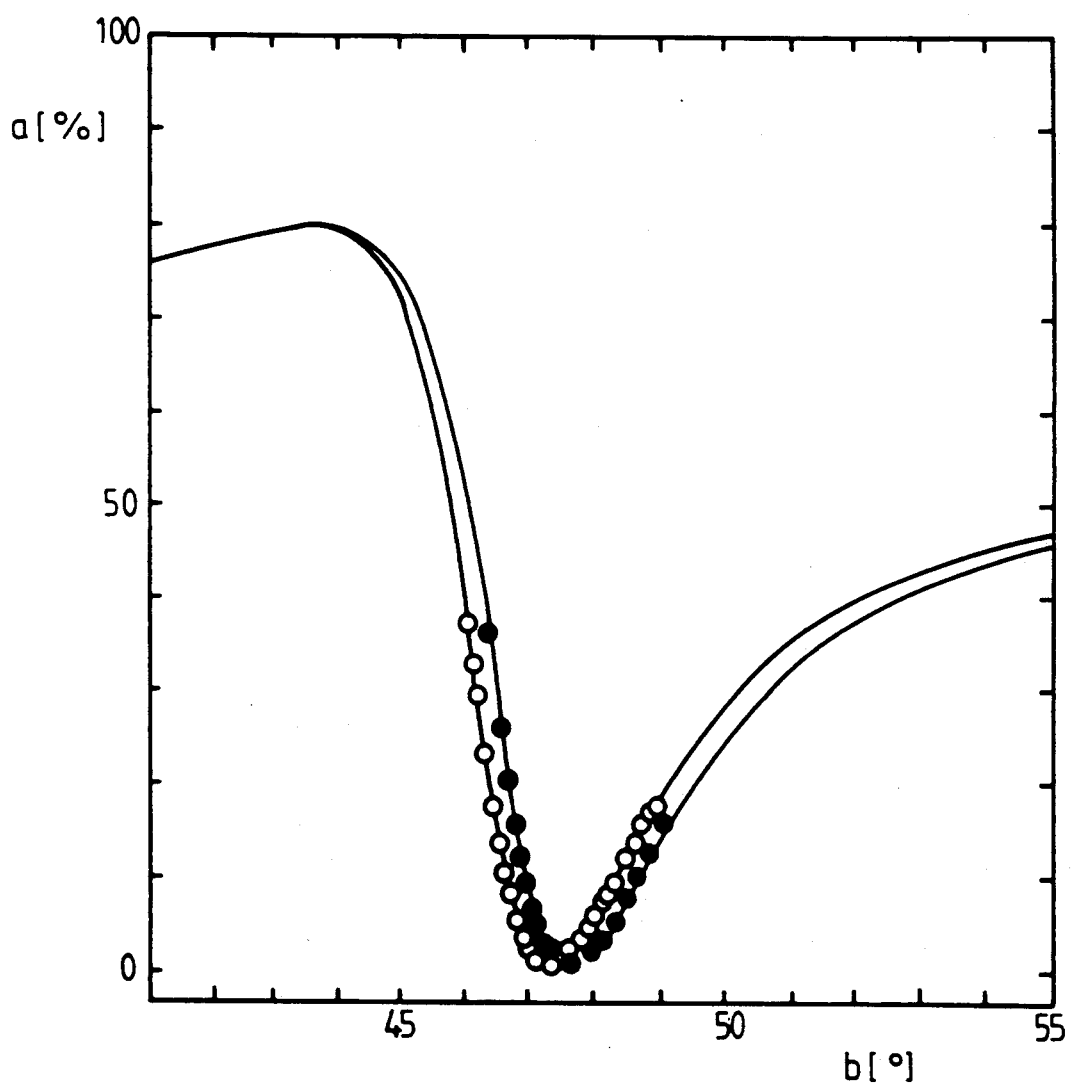
FIG. 2 is a graph of the relative intensity of the reflected light, "a[%]" as recorded by SPM, vs. the angle of incidence of the light source to the surface, "b[°]".

Using angle-dependent SPM as described above it is possible for the first time to characterize the crystalline and amorphous areas separately in respect of refractive index and thickness. The result is shown in FIG. 2, where a [%] denotes the reflected intensity in % and b [°] denotes the angle of incidence in degrees. The resonance curve is less shifted, relative to the uncoated metal, for the amorphous areas (circles) than the crystalline areas (dots).

Since the thickness of the monolayer in the crystalline areas of the condensed phase was known from synchrotron X-ray experiments (see C. Helm, PhD thesis, Munich 1988), their refractive index is obtained as $n_1 = 1.51$. The thicknesses of the liquid/amorphous areas are less well defined in the X-ray reflectance measurement on the water surface, but can be estimated to be 1.55 nm. The refractive index of the amorphous areas is then $n_2 = 1.304$. This is a surprisingly low value which, however, is comparable to a similarly low value for the electron density of the amorphous phase determined by X-ray studies.

EXAMPLE 2

A chromium/gold layer as described in Example 1 is coated with an SiO$_2$ CVD layer structured via an electron microscope grid made of copper. The sample thus prepared is examined by the method according to the present invention. The refractive index of an SiO$_2$ layer is 1.46. The computation of best fit gives a thickness of 3 nm, which is in good agreement with the thickness determined by means of an oscillating quartz crystal during the CVD process.

We claim:

1. A method for determining the thickness of layers $<1$ $\mu m$ thick, which comprises: applying the layer to a solid support, which support is glass coated with a thin chromium layer and overcoated with a gold layer, the combined chromium and gold layers having a thickness $\leq 70$ nm, subjecting the supported layer to surface plasmon microscopy using a laser light source at an angle of incidence, b°, recording the reflected image from the layer to obtain a lateral resolution image of the layer, determining the reflected light intensity from the reflected image and determining the thickness of the layer as a function of the reflected light intensity, and the angle of incidence, b°.

2. The method of claim 1, wherein the thickness of the layers is determined with a vertical resolution $\geq 0.1$ nm and a simultaneous lateral resolution $\geq 5$ $\mu m$.

3. The method of claim 2, wherein the layer to be examined is chemically, physico-chemically or biologically active.

4. The method of claim 3, wherein the layer to be examined is used for the construction of a time-dependent sensor.

5. The method of claim 1, wherein the layers to be examined are chemically, physico-chemically or biologically active.

6. The method of claim 5, wherein the layer to be examined is used for the construction of a time-dependent sensor.

7. The method of claim 1, wherein the chromium layer has a thickness of 2.5-10.0 nm and the gold layer has a thickness of 10-45 nm.

* * * * *